Patented Aug. 11, 1931

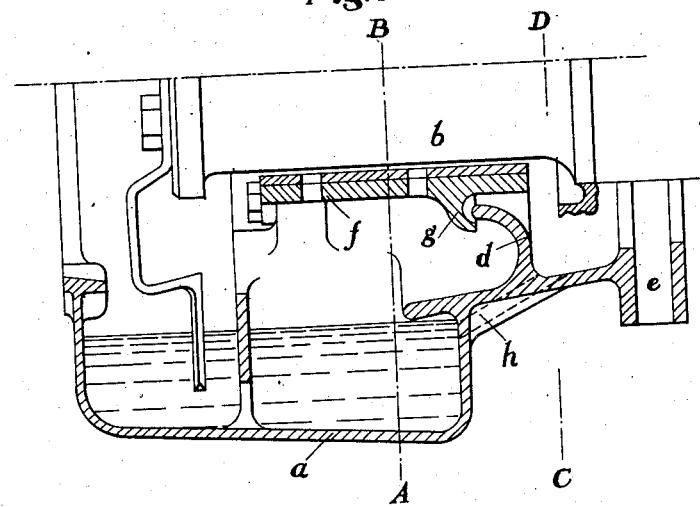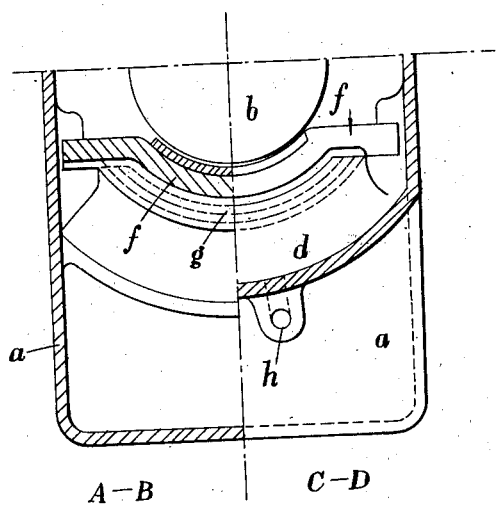

1,818,864

UNITED STATES PATENT OFFICE

WALTER PEYINGHAUS, OF EGGE, NEAR VOLMARSTEIN, GERMANY

AXLE BOX FOR VEHICLES

Application filed December 5, 1930, Serial No. 500,354, and in Germany June 9, 1929.

This invention relates to axle boxes for vehicles of the type in which oil for the purpose of lubricating the journal piece of the axle is retained in a container under the journal piece.

Such boxes are usually provided with a device called a dust pocket for protecting the oil in the container from dust and like foreign matter.

In axle boxes of the above mentioned character, if the vehicle is subjected to considerable vibration or to sudden changes in direction the oil spills over the edges of the container or oil bath and floods the dust pocket. This fault is particularly prevalent in axle bearings on railway vehicles wherein the oil is supplied mechanically by bucket or centrifugal action as such bearings have large oil baths and no lubricating device in the box under the axle limbs which might damp the movement of the oil.

It is the object of the present invention to prevent the oil from passing into the dust pocket.

In accordance with the present invention a transverse wall having a conchoidal cross section is mounted between the container or oil bath and the dust pocket and extends over a projection of curved cross section on the bearing box.

The invention will be described in conjunction with the accompanying drawings of which Fig. 1 shows a longitudinal section of the lower half of a vehicle axle box, whilst Fig. 2 shows two cross sections on the lines A B and C D. A B being a view towards the emergency path and C D a view towards the oil bath.

Referring to the drawings $a$ is the oil bath, $b$ the journal piece of the axle, $e$ the dust pocket, $d$ the transverse wall of curved cross section between the oil bath and the dust pocket, $f$ the collecting shell on the lower part of the bearing box, and $g$ the projection of curved cross section on the bearing box $f$ which extends under the portion $d$.

Any oil which may spill over the edges of the oil bath $a$ due to excessive vibration or shocks, strikes the portion $g$ and is diverted by the curvature of portion $d$ back to the oil bath $a$, whereby the oil is prevented from passing into the dust pocket $e$. The projection $g$ by fitting under the portion $d$ separates the two chambers $a$ and $e$ with relation to one another.

The portion $d$ as above described has a cross section of curved or arcuate shape and this wall $d$ extends in substantially a quadrant under the oil collector $f$, as shown more particularly in Figure 2.

Extending from the dust chamber back to the oil reservoir is a small duct $h$. This duct $h$ is of such cross section that the oil dripping from the axle $b$ will be led back into the oil reservoir through the duct $h$, but when the box is subjected to shocks, sufficient oil will not be injected into the dust receptacle to cause any damage but will flow back into the oil reservoir. The projection $g$ is also curved in conformity with the oil collector $f$ as shown particularly in Figure 2 and as above stated, this projection has a curved or arcuate cross section.

Various modifications will naturally suggest themselves to those skilled in the art without departing from the spirit of my invention.

What I claim is:—

1. In a bearing box for vehicle axles, a bearing, a dust pocket, an oil collecting shell disposed below said bearing, a projection thereon curved in cross section, a transverse wall separating the shell and the pocket, said wall having a curved cross section and extending partly over the projection in overlapping relation.

2. In a bearing box for vehicle axles, means above the axle for dropping lubricating oil thereupon, means below the axle for catching oil dropping from the axle, a projection upon said means for catching oil, means for preventing foreign matter from entering said oil catching means and means comprising a fixed curved wall upon the lower portion of the box between the oil catching means and the preventing means cooperating with said projection upon said oil catching means for preventing the oil in the oil catching means from splashing into said preventing means.

3. In a bearing box for vehicle axles, a first chamber, a second chamber, a fixed member in said first chamber, a curved member upon said fixed member extending toward said second chamber and a curved wall fixed to the box located in said second chamber extending toward said first chamber and overlapping part of said curved member upon said fixed member.

In testimony whereof I have signed my name to this specification.

WALTER PEYINGHAUS.